United States Patent
Morisaki

(10) Patent No.: US 7,342,693 B2
(45) Date of Patent: Mar. 11, 2008

(54) IMAGE READING DEVICE

(75) Inventor: Hiroshi Morisaki, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 889 days.

(21) Appl. No.: 10/231,168

(22) Filed: Aug. 30, 2002

(65) Prior Publication Data
US 2003/0053153 A1    Mar. 20, 2003

(30) Foreign Application Priority Data
Aug. 31, 2001    (JP)    ............................ 2001-263946

(51) Int. Cl.
H04N 1/04    (2006.01)
G03G 15/00    (2006.01)
B65H 5/02    (2006.01)

(52) U.S. Cl. ...................... 358/496; 358/498; 399/367; 271/272

(58) Field of Classification Search ................. 358/496, 358/498, 474; 399/367; 271/272
See application file for complete search history.

(56) References Cited

U.S. PATENT DOCUMENTS 5,971,388 A * 10/1999 Hattori et al. ........... 271/10.03
6,826,374 B2 * 11/2004 Kato et al. ..................... 399/16
2004/0070798 A1 * 4/2004 Andersen et al. ........... 358/498

FOREIGN PATENT DOCUMENTS

JP    A 11-29246    2/1999
JP    B2 2952981    7/1999

* cited by examiner

Primary Examiner—Houshang Safaipour
(74) Attorney, Agent, or Firm—Oliff & Berridge, PLC

(57) ABSTRACT

An image reading device includes a main body and an openable cover. A sheet feed path is defined inside the cover. An intermediate portion of the sheet feed path is exposed to the top surface of the main body, thereby the top surface defines a part of the sheet feed path at the intermediate portion. The cover is provided with a sheet feed mechanism. Feeding of the sheet is terminated when the cover is opened. The image reading device further includes a sheet location detection system that detects a location of the sheet when the feeding of the sheet is terminated, and a controller determines whether the sheet is to be discharged from the sheet feed path, when the cover is closed, in accordance with a location of the sheet detected by the sheet location detection system.

17 Claims, 8 Drawing Sheets

IMAGE READING DEVICE

BACKGROUND OF THE INVENTION

The present invention relates to an image reading device, and a method for controlling a sheet feed to be employed in the image reading device such as a copying machine, facsimile machine, scanning machine or the like.

An image reading device is employed in various apparatuses as described above. For example, there has been known a facsimile apparatus having a main body provided with a transparent surface on a top surface thereof, and a cover which is swingablly secured on the main body to cover/uncover the transparent surface. When the facsimile apparatus is used to read an original, the original is placed on the transparent surface and the image sensor is moved to scan an entire surface of the sheet placed on the transparent surface. This type of the facsimile apparatus is well-known as a flat-bed type apparatus.

There has been known an improved facsimile apparatus which has, in addition to the above structure, an automatic sheet feeding mechanism provided to the cover. The automatic sheet feeding mechanism functions to feed a plurality of sheets, which are placed on a sheet tray formed on the cover in a stacked manner, one by one. The sheet fed by the sheet feeding mechanism is fed along a sheet feed path, which is defined in the cover. The sheet feeding path is configured such that the sheet being fed is exposed to the image sensor at an intermediate portion thereof. Thus, the sheet fed from the sheet tray is fed past the image sensor located at a predetermined position, thereby an image formed on the sheet being scanned. The sheet is further fed along the remaining portion of the sheet feed path defined inside the cover, and is finally discharged therefrom.

In such a facsimile apparatus, if the cover is opened when a sheet is being fed, the sheet feeding operation should be temporarily terminated until the cover is closed. However, depending on the location of the sheet, a part of the sheet may hang from the opened cover. If the cover is closed in such a status, a part of the sheet may be caught by a nip between the cover and the main body. If the sheet feeding mechanism is actuated in such a condition, a sheet jam may occur.

Generally, sheet sensors are provided in the cover to detect a location of the sheet fed through the sheet feeding path. Such sensors should be configured not to obstacle the movement of the sheet. For this purpose, each sensor is configured to have a driven member which can easily be driven by the sheet to detect the presence of the sheet. Due to such a configuration, however, the driven member is easily driven by a vibration which is caused when the cover is opened and/or closed. If the sensors erroneously function, the location of the sheet and/or occurrence of the sheet jam cannot be detected accurately.

SUMMARY OF THE INVENTION

The present invention is advantageous in that an improved image reading device capable of discharging an original after an interruption of feeding of the same, and a method of controlling such an operation.

According to an embodiment of the invention, there is provided an image reading device having a main body and a cover, the cover being opened/covered a top surface of the main body, a sheet feed path being defined inside the cover. An intermediate portion of the sheet feed path facing the top surface of the main body is exposed to the top surface of the main body, thereby the top surface defines the sheet feed path at the intermediate portion. The cover is formed with a sheet feed mechanism which feeds a sheet along the sheet feed path, feeding of the sheet being terminated at least one of when the cover is opened and when a command indicating termination of sheet feed is input. The image reading device further includes a sheet location detection system that detects a location of the sheet when the feeding of the sheet is terminated, and a controller that determines whether the sheet is to be discharged from the sheet feed path, at least one of when the cover is closed and when a command indicating restart of sheet feed is input, in accordance with a location of the sheet detected by the sheet location detection system.

With this configuration, since the location of the sheet is known, it becomes possible to discharge the sheet only when a sheet jam would not occur when the feeding is restarted.

Optionally, the sheet location detection system may include a first sensor that is located at an upstream side end of the sheet feed path to detect whether a sheet is absent or present, and a second sensor that is located at an upstream side of and close to the intermediate portion to detect whether a sheet is absent of present. Further, the controller may determine the sheet it to be discharged only when one of the first sensor and the second sensor detects presence of a sheet.

If the first sensor is ON and the second sensor is OFF, the leading end of the sheet is considered to be located between the first and second sensors. In such a case, the sheet jam may not occur when the feeding is restarted. If the first sensor is OFF and the second sensor is ON, the leading end of the sheet is considered to be spaced from the intermediate portion, on the downstream side of the intermediate portion, and therefore, the sheet jam would not occur, when the feeding is restarted.

If both the first and second sensors are ON, the leading end of the sheet is likely located at the intermediate portion. In such a case, if the feeding is restarted with the cover closed, sheet jam may likely occur, and therefore, the feeding is not performed in such a case.

In a particular case, the feeding of the sheet is terminated when the cover is opened, and wherein the feeding of the sheet is restarted when the cover is closed.

According to embodiments, an image sensor is provided on the main body at a position facing the intermediate portion of the sheet feed path.

Optionally, the sheet location detection system detects a leading end of a sheet fed through the sheet feed path.

In this case, the controller may determine that the sheet is to be discharged if the leading end of the sheet, when the feeding of the sheet is terminated, is detected to be located on an upstream side of the intermediate portion.

Optionally or alternatively, the image reading device may include a sheet discharging system located on a downstream side of the intermediate portion, the sheet discharging system feeding a sheet to discharge from the sheet feed path, wherein the controller determines that the sheet is to be discharged if the leading end of the sheet, when the feeding of the sheet is terminated, is detected to be located on a downstream side of the sheet discharging system.

Optionally or alternatively, the controller may determine that the sheet is not to be discharged if the leading end of the sheet, when the feeding of the sheet is terminated, is detected to be located in the intermediate portion.

Optionally, the image reading device may include a sheet discharging system located on a downstream side of the intermediate portion, the sheet discharging system feeding a sheet to discharge from the sheet feed path. In this case, the controller may determine that the sheet is not to be discharged if the leading end of the sheet, when the feeding of the sheet is terminated, is detected to be located in the intermediate portion or a downstream side thereof and on an upstream side of the sheet discharging system.

According to embodiments, a display unit is provided, and the controller controls the display unit to display an error message when the controller determines that the sheet is not to be discharged.

According to embodiments, the sheet location detection system may include a sensor located at an upstream side end of the sheet feed path to detect presence of a sheet, and a feeding amount detection system that detects a feeding amount of a sheet fed by the sheet feed mechanism. With this configuration, the location of the sheet is detected based on the feeding amount after the sensor detects presence of the sheet.

According to another aspect of the invention, there is provided an image reading device having a main body and a cover, the cover being opened/covered a top surface of the main body, a sheet feed path being defined inside the cover, an intermediate portion of the sheet feed path facing the top surface of the main body being exposed to the top surface thereby the top surface define the sheet feed path at the intermediate portion, the cover having a sheet feed mechanism which feed a sheet along the sheet feed path, feeding of the sheet being terminated at least one of when the cover is opened and when a command indicating termination of sheet feed is input. Such an image reading device further includes a cover open sensor that detects whether the cover is opened or closed, a sheet location detection system that detects a location of the sheet when the cover is closed, and a controller that determines whether the sheet is to be discharged from the sheet feed path in accordance with a location of the sheet detected by the sheet location detection system.

With this configuration, the location of the sheet is detected after the cover is closed.

In this case, the location of the sheet is detected a predetermined time period after the cover open sensor detects that the cover is closed.

When the cover is closed, a sensor of the sheet location detection system may malfunction due to the vibration caused by the movement of the cover. By ignoring the output of the detection system predetermined time period after the closure of the cover, the above deficiency is avoided.

Optionally, the sheet location detection system may include at least a sensor arranged in the sheet feed path to detect presence of a sheet, the sensor having a movable member to be moved by a sheet being fed through the sheet feed path, the sensor detects present of a sheet in response to movement of the movable member.

Since the malfunction of the sensor due to the movement of the cover can be avoided as described above, the sensor which is sensitive to the movement of the sheet can be used.

Optionally, at least a sensor may include a first sensor located at an upstream side end of the sheet feed path.

According to a further aspect of the invention, there is provided a method of feeding a sheet in an image reading device having a main body and a cover, the cover being opened/covered a top surface of the main body, a sheet feed path being defined inside the cover, an intermediate portion of the sheet feed path facing the top surface of the main body being exposed to the top surface thereby the top surface define the sheet feed path at the intermediate portion, the cover having a sheet feed mechanism which feed a sheet along the sheet feed path, feeding of the sheet being terminated at least one of when the cover is opened and when a command indicating termination of sheet feed is input. The method includes detecting a location of the sheet when the feeding of the sheet is terminated, and determining whether the sheet is to be discharged from the sheet feed path, at least one of when the cover is closed and when a command indicating restart of sheet feed is input, in accordance with a location of the sheet.

According to the method, depending on the location of the sheet, it may be discharged or remained, thereby the sheet jam would not occur.

It should be noted that the method could be performed by a computer or the like, provided that it is represented in the form of program. Such a program can be stored in a recording medium such as a CD-R or the like, or may be distributed through a network system such as LAN, WAN or the Internet.

Optionally, the method further includes discharging the sheet when the sheet is determined to be discharged, and/or displaying a predetermined message when the sheet is determined not to be discharged.

BRIEF DESCRIPTION OF THE ACCOMPANYING DRAWINGS

DETAILED DESCRIPTION OF THE EMBODIMENT

Hereinafter, exemplary embodiments of the invention will be described with reference to the accompanying drawings.

Figure 1:
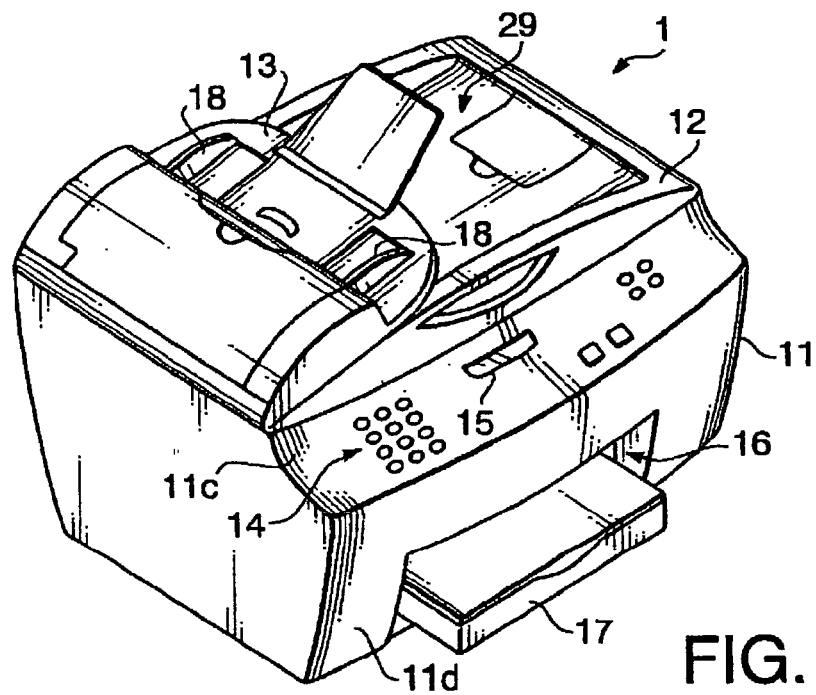
FIG. 1 shows a perspective view of a facsimile apparatus according to an embodiment of the invention when a cover is closed.
Figure 2:
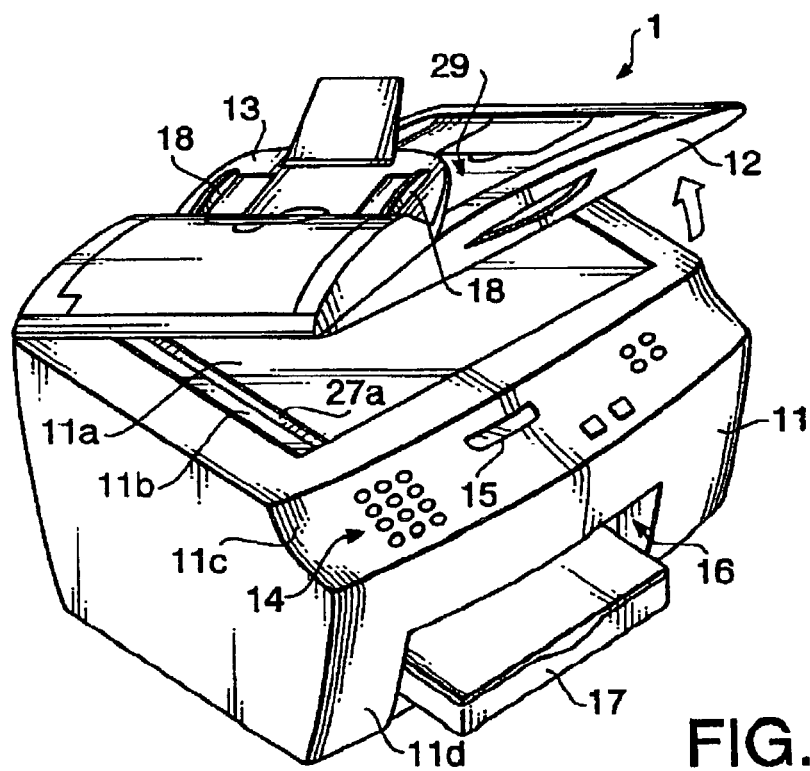
FIG. 2 is a perspective view of the facsimile apparatus shown in FIG. 1 when the cover is opened.
Figure 3:
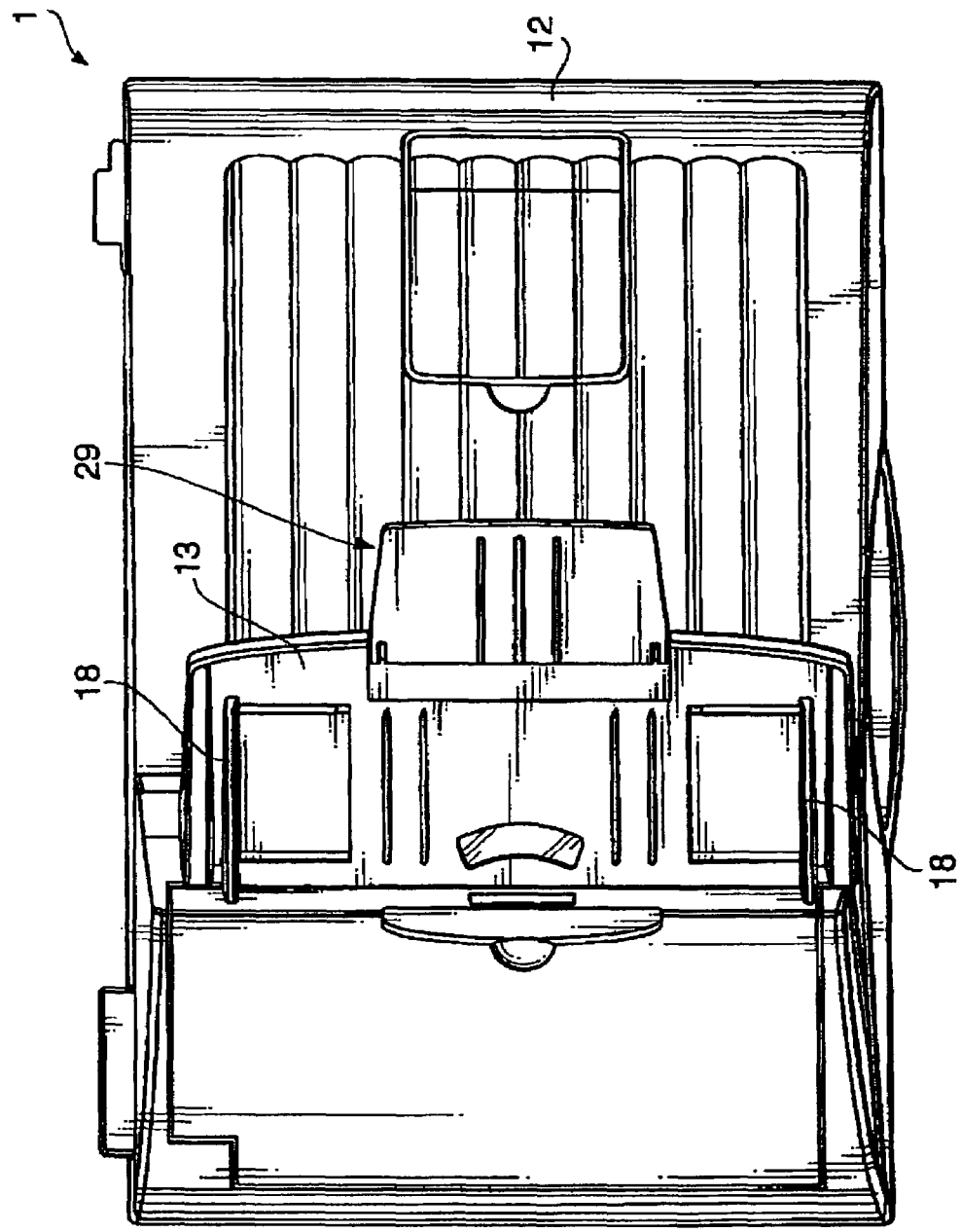
FIG. 3 is a top view of the facsimile apparatus shown in FIG. 1.

FIG. 1 shows a perspective view of a facsimile apparatus 1 to which sheet feed control operations according to embodiments of the invention can be applied. FIG. 1 shows a case when a cover of the facsimile apparatus 1 is closed. FIG. 2 is a perspective view of the facsimile apparatus 1 when the cover is opened. FIG. 3 is a top view of the facsimile apparatus 1.

The facsimile apparatus 1 includes a printing device which performs a printing operation utilizing, for example, an inkjet printing method, an image reading device (hereinafter, referred as an image scanner), a data communication device having various data communication functions.

The facsimile apparatus 1 is configured such that, when connected to a personal computer of the like, the facsimile apparatus 1 functions as an image scanner or a printer. If the inkjet printer is used in association with the image scanner (i.e., to print an image scanned by the image scanner), the facsimile apparatus 1 functions as a copying machine.

The facsimile apparatus 1 has a main body 11 having a transparent surface (e.g., a glass plate) 11a on a top surface thereof, and a cover 12 which is swingablly secured on the main body 11 to cover/uncover the transparent surface 11a. When the facsimile apparatus 1 is used to read an original, the original is placed on the transparent surface 11a. This type of the apparatus 11 is well-known as a flat-bed type apparatus.

Further to the above structure, the cover 12 is provided with an automatic sheet feeding mechanism, which feeds a plurality of sheets placed on an original placing table 12 one by one. The original fed by the sheet feeding mechanism is scanned using an image sensor provided on the main body 11. On the lower surface of the cover 12, an original covering member 12a is provided, which faces the transparent surface 11a, and covers the original placed on the transparent surface 11a.

On a top front surface 11c of the main body 11, an operation unit 14 including a plurality of operation buttons to be manually operated by a user, and a display unit 15 which displays various information are provided. On a lower front surface lid, an opening 16 is formed, through which a paper tray 17 is inserted/withdrawn.

On a sheet tray 13 formed on the cover 12, a pair of restriction ribs 18 are formed. The pair of restriction ribs 18 are configured to be movable in a direction of a width of the original placed on the sheet tray 13 so that a distance therebetween is adjusted to meet the width of the original on the sheet tray 13. On the sheet tray 13, a plurality of sheets can be placed in a stacked manner.

Figure 4:
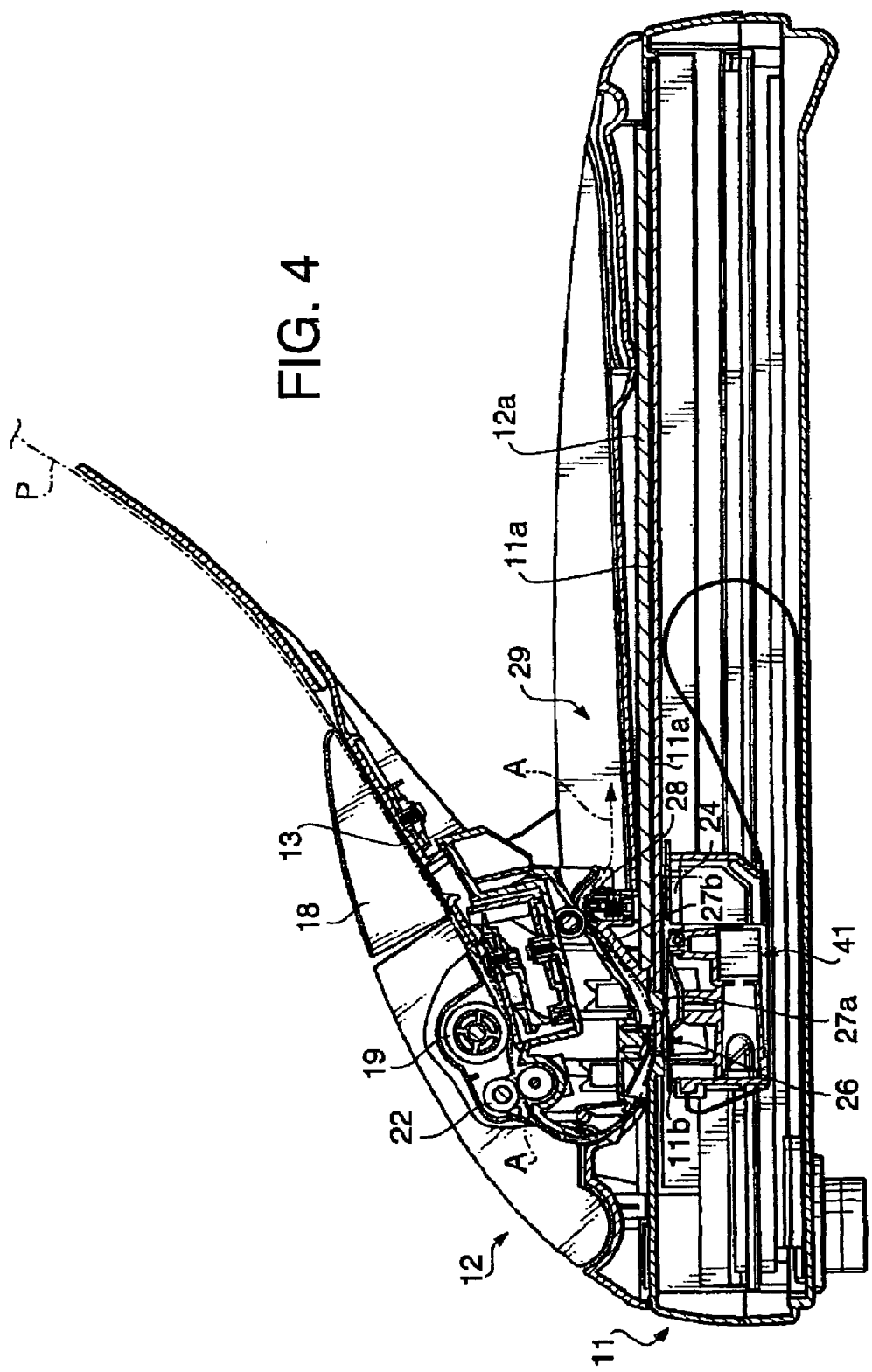
FIG. 4 is a cross-sectional view of the facsimile apparatus showing a main portions thereof.
Figure 5:
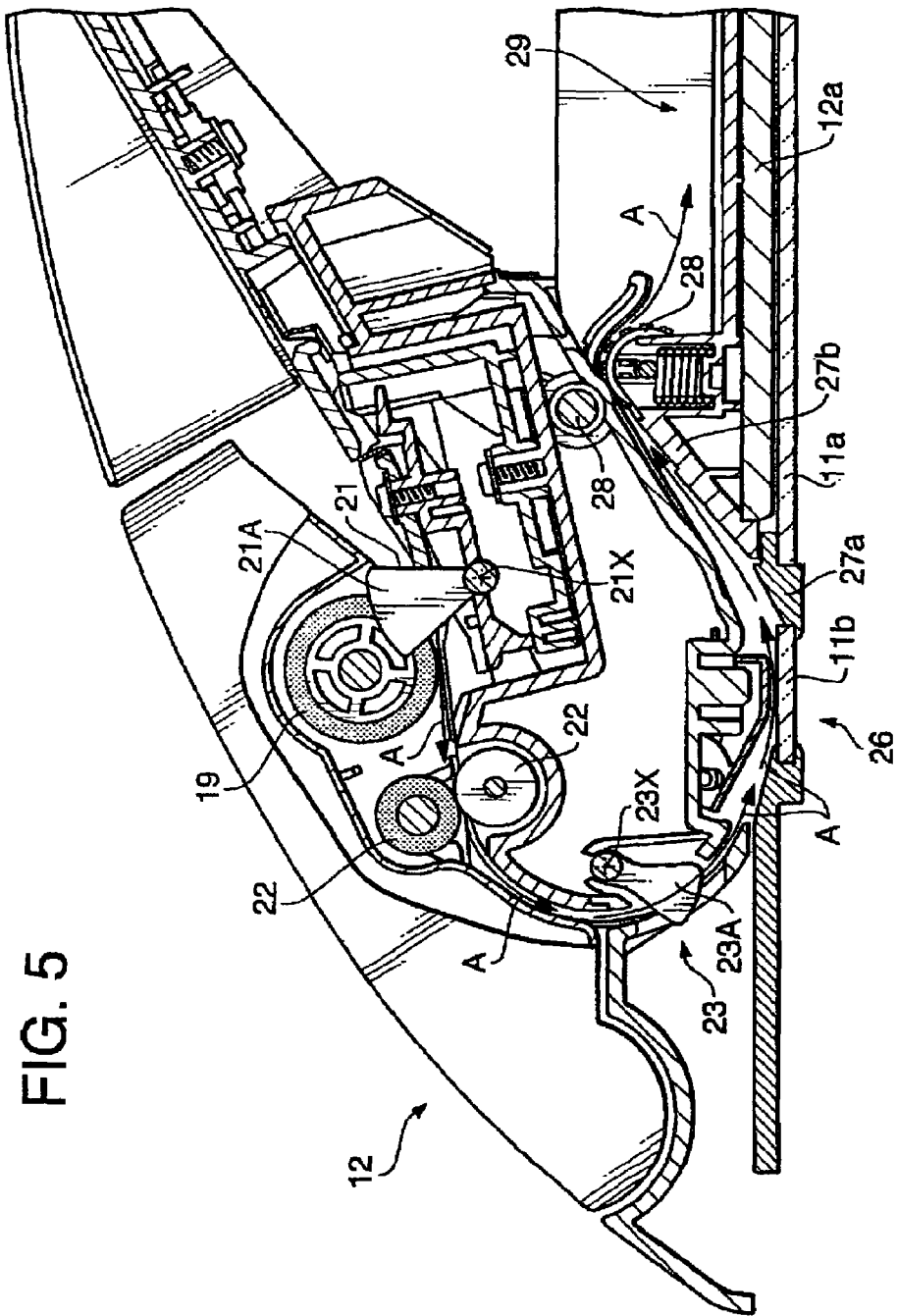
FIG. 5 is an enlarged cross-sectional view of a part of the cover of the facsimile apparatus.

FIG. 4 is a cross-sectional view of the main body 11 and the cover 12, and FIG. 5 is an enlarged cross-sectional view showing a part of the cross-sectional view shown in FIG. 4. A leading end of a sheet P placed on the sheet tray 13 contacts a sheet feed roller 19, which is driven by a not shown motor to rotate. The sheet P is fed in response to rotation of the sheet feed roller 19. The sheet P proceeds along a sheet feed path A which is indicated by a thick lines in FIGS. 4 and 5. As shown in drawings, the sheet feed path A is substantially U-shaped when viewed from a side.

As shown in FIG. 5, in the vicinity of the sheet feed roller 19, a first feed sensor 21 is provided, which detects an original fed by the sheet feed roller 19. The first feed sensor 21 is a pendulum type sensor configured to have a fan-shaped rotatable member 21A that is rotated, with only a small force, about a predetermined rotation axis 21X. When the sheet P is located at the sensor 21, the rotatable member is rotated by the sheet P, thereby the sensor 21 detects presence/absence of the sheet at the sensor position.

On a downstream side of the sheet feed roller 19 but close there to, a pair of feeding rollers 22 are provided. The feeding rollers 22 are driven by a not shown motor. The sheet P fed from the sheet feed roller 19 is nipped and further fed, by the pair of feeding rollers 22, to the downstream side along the sheet feed path A.

Further, at a predetermined position on a downstream side of the pair of feeding rollers 22 along the sheet feed path A, a second feed sensor 23 (see FIG. 5) is provided. Similarly to the first feed sensor 21, the second feed sensor 23 is also a pendulum type sensor configured to have a fan-shaped rotatable member 23A that is rotated, with only a small force, about a predetermined rotation axis 23X. When the sheet P is located at the sensor 23, the rotatable member is rotated by the sheet P, thereby the sensor 23 detects presence/absence of the sheet at the sensor position.

FIG. 5 shows a condition where each of the rotatable members 21A and 23A is not rotated. In other words, in the condition shown in FIG. 5, each of the sensor 21 and 23 does not detect the presence of the sheet P (i.e., they detect the absence of the sheet P).

On the downstream side of the second feed sensor 23 (i.e., at an intermediate portion of the sheet feed path A), there is a unit 26 which defines, in association with the upper surface of the main body 11 (see FIG. 4), a part of the sheet feed path A. A reading unit 41, which includes an image sensor 24, is mounted on the main body 11 (see FIG. 5), and the unit 26 faces the reading unit 41. Hereinafter, the unit 26 will be referred to as a facing member 26. It should be noted that, as the facing unit 26 is mounted on the cover 12, when the cover 12 is opened, the facing unit 26 is exposed to outside.

On the top surface of the main body 11, a second transparent surface 11b is formed, which is defined at a position facing the sheet P that is fed by the automatic sheet feeding mechanism provided in the cover 12. On the downstream side of the facing unit 26, along the sheet feed path A, a first slope 27a and a second slope 27b, which guide the sheet P in an obliquely upward direction, are provided. Specifically, first slope 27a is formed on the main body 11 in order to change a proceeding direction of a sheet P, and the second slope 27b is formed on the cover 12 to guide a sheet P to the discharge rollers 28. As shown in FIG. 5, a step is formed between the downstream end of the transparent surface 11b and the upper surface of the slope 27a so that the sheet P proceeds smoothly toward the obliquely upward direction. Further, on the downstream side of the first and second slopes 27a and 27b, along the sheet feed path A, a pair of discharge rollers 28, which are driven by a not shown motor to discharge the sheet P from the sheet feed path A, are provided.

With this configuration, a sheet P fed along the sheet feed path A is scanned by the reading unit 24 (where the facing unit 26 is located). Then, the sheet P passed through the facing unit 26 is directed in the obliquely upward direction by the first and second slopes 27a and 27b. Finally, the sheet P is fed to be discharged by the discharge rollers 28 from the end extremity of the sheet feed path A onto a recessed portion 29 formed on the cover 12.

It should be noted that the reading unit 41 is configured to be movable in the right-and-left direction in FIG. 5 so as to be able to scan an original placed on the transparent surface 11a. That is, when the sheet P fed along the sheet feed path A is scanned, the reading unit 41 stays in a position shown in FIG. 5, and scans the sheet P through the second transparent surface 11b, while when a sheet P placed on the transparent surface 11a, the reading unit 41 moves in the right-and-left direction in FIG. 4 to scan the entire surface of the sheet P.

Figure 6:
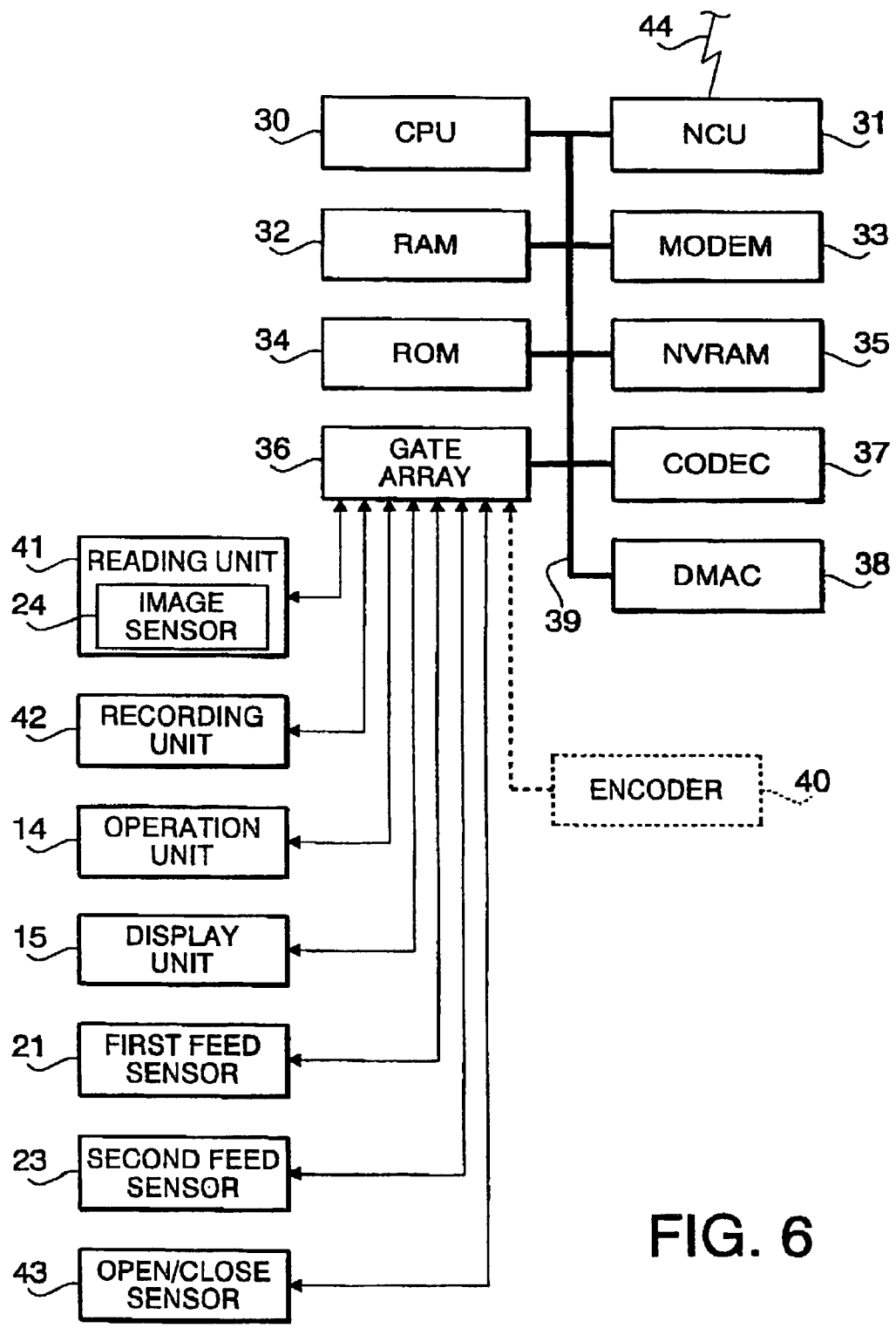
FIG. 6 is block diagram of the facsimile apparatus showing a control system thereof.

FIG. 6 is a block diagram showing electronic configuration of the facsimile apparatus 1.

As shown in FIG. 6, the facsimile apparatus 1 is provided with a CPU 30, an NCU 31, a RAM 32, a modem 33, a ROM 34, an NVRAM (non-volatile memory) 35, a gate array 36, a codec 37 and a DMAC 38, which are interconnected with each other through a bus 39. The bus 39 includes an address bus, data bus and control signal lines. Further, the gate array 36 is connected with the reading unit 41, a recording unit 42, an operation unit 14, a display unit 15, the first feed sensor 21, the second feed sensor 23 and an open sensor 12 that is used for detecting an open/close status of the cover 12. The NCU 31 is connected with a public telephone line 48.

The CPU 30 controls the entire operation of the facsimile apparatus 1. The NCU 31 controls a connection through the public telephone line 44. The RAM 32 is used as a working area for the CPU 30 and temporarily stores various data when the CPU 30 executes various operations. The modem 33 performs modulation/demodulation of facsimile data to be sent/received through the public telephone line 44. The ROM 34 stores programs to be performed by the CPU 30. The NVRAM 35 is used for storing various data. The gate array 36 functions as an interface between the CPU 30 and the units connected thereto. The codec 37 performs encoding/decoding the facsimile data or the like. The DMAC 38 mainly performs reading/writing of data in the RAM 32. In FIG. 6, an encoder 40 is indicated by broken lines. The encoder 40 is employed in the second embodiment, and will be described later.

The reading unit 41 includes the aforementioned image sensor 24, which scans an image on a sheet P under control of the CPU 30. The recording unit 42 includes, for example, an inkjet printer, which performs color and/or black-and-white printing operations under control of the CPU 30. The operation unit 14 is provided with a numeric keypad, and various other operation keys for allowing a user to input various commands to the CPU 30 in the form of command signals. The display unit 15 includes, for example, an LCD, which displays various pieces of information such as operation status and operation guidance.

According to the embodiment, when the cover 12 is opened/closed, it is judged wither a sheet P currently located in the sheet feed path A should be discharged or not.

That is, if the cover 12 is opened, feeding of the sheet P along the sheet feed path A is stopped. In such a case, if the leading end of the sheet P is located in the vicinity of the facing unit 26, the sheet P hangs from the cover 12. If the cover 12 is closed with such a condition, the sheet P may be wedged between the cover 12 and the main body 11. If the sheet P is forcibly discharged in such a condition, the sheet may likely be jammed. In such a case, therefore, it is preferable that a discharging operation is not performed.

Hereinafter, sheet feed operations according to three embodiments will be described with reference to flowcharts shown in FIGS. 7 through 9.

First Embodiment

Figure 7:
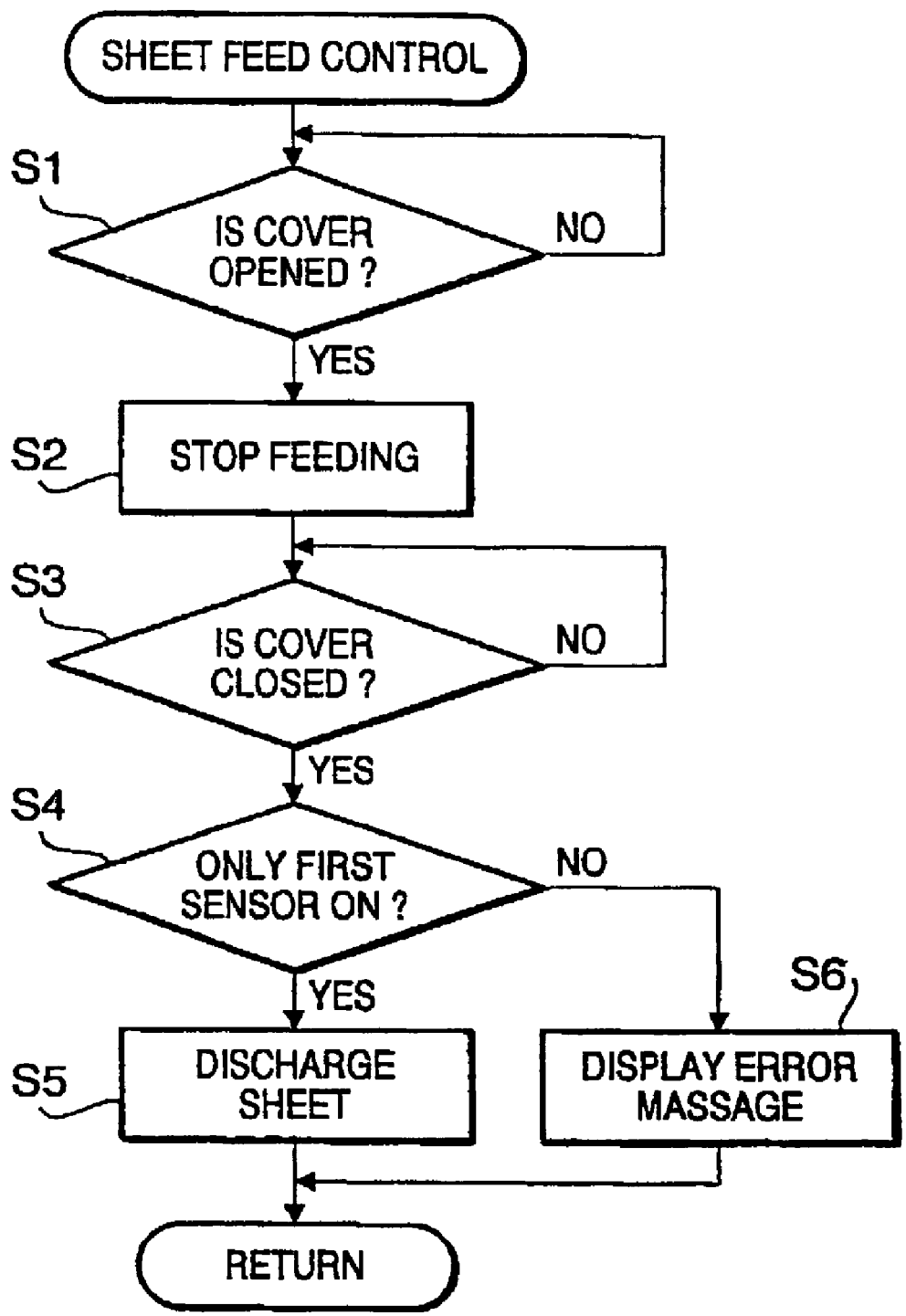
FIG. 7 is a flowchart illustrating a sheet feed control of the facsimile apparatus according to a first embodiment.

FIG. 7 is a flowchart showing a sheet feed operation according to a first embodiment. It should be noted that the sheet feed operation is performed when a sheet P is being fed inside the facsimile apparatus 1.

In S1, the CPU 30 judges whether the cover 12 is opened or not. The detection is performed by monitoring the output of the open/close sensor 43 provided to the cover 12. If the cover 12 remains closed (S1:NO), control repeats S1 until it is detected that the cover 12 is opened.

If the cover 12 is opened (S1: YES), control proceeds to S2. It should be noted that the cover 12 maybe opened by a user when the user found a wrong sheet placed on the sheet table 13, intended to restart a printing operation, and then stopped the same. In such a case, i.e., when the cover 12 is opened when the sheet P is being fed, the CPU 30 temporarily stops the rotation of the feed rollers 22 to stop feeding of the sheet P (S2).

Then, the CPU 30 judges whether the cover 12 is closed (S3). If the user has closed the cover 12, the CPU 30 detects that the cover 12 is in closed status based on the output of the sensor 43 (S3: YES).

In S4, the CPU 30 judges whether or not only the first senor 21 is ON and the second sensor 23 is OFF. If only the sensor 21 is ON (S4: YES), the CPU 30 drives the discharge rollers 28 to discharge the sheet P from the sheet feed path A (S5). If the judgment in S4 is negative, for example, when both the first and second sensors 21 and 23 are OFF (S4: NO), the CPU 30 displays an error message indicating that a sheet jam may occur on the display unit 15 (S6).

It should be noted that, when only the first sensor 21 is ON (S4: YES), a sheet P may have been fed from the sheet tray 13 along the sheet feed path A, but the leading end thereof has not reached the second sensor 23. In other words, in such a case, it is likely that at least the leading end of the sheet has not reached the facing unit 26. In such a case, when the cover 12 is closed, the sheet P can be discharged without fail since the leading end of the sheet P remains at a position between the first and second sensors 21 and 23.

In an alternative case, one of a plurality of sheets P may have been fed such that the trailing end has been fed past the sensor 23, and the leading end of the succeeding sheet has reached the sensor 21. That is, the preceding sheet P may be held by the discharge roller 28. In such a case, even though the trailing end of the sheet may be located at the facing unit 26, the sheet P can be discharged without fail when the cover 12 is closed.

When both the first and second sensors 21 and 23 are ON (S4: NO), a sheet P may have been fed from the sheet tray 13, passed through the sensor 23 and the leading end of the sheet P may be about to reach the facing unit 26. In such a case, when the cover 12 is closed, it is likely that the sheet P is nipped between the main body 11 and a sheet cover 12a of the cover 12. In this case, if the sheet is further fed, the sheet jam may occur. Therefore, the discharging operation will not be performed.

As described above, according to the first embodiment, a location of a sheet P along the sheet feed path A is determined based on the outputs of the first and second sensors 21 and 23, and the CPU 30 determines whether the sheet P is to be discharged or not when the cover 12 is closed. Therefore, possibility of the sheet jam when the sheet P is discharged after the cover 12 is once opened and then closed can be significantly reduced. Accordingly, the user will not disturbed by a process to deal with the jammed sheet, and therefore, an apparatus easy to operate can be provided.

In an alternative embodiment, the judgment in S4 may be changed to judge whether or not only the second sensor 23 is ON, and the discharging operation is performed when only the second sensor 23 is ON. When the last sheet P of the stack of sheets placed on the sheet tray 13 has been fed from the sheet tray 13, the first sensor 21 is OFF while the sensor 23 is ON, and at this stage, the leading end of the sheet P is not located at the facing unit 26. In such a case, the CPU 30 can discharge the sheet P without causing the sheet jam. It should be noted that, in this control, the sheet P must have a predetermined size, for example, A4. If the sheet size is smaller than A4, even though only the second sensor 23 is ON, the leading end of the sheet may be located at the facing unit 26. Therefore, in this alternative embodiment, the sheet size should be fixed.

It should be note that the above-described alternative embodiment may be incorporated in the first embodiment. In such a case, if only one of the first sensor 21 and second sensor 23 is ON, the sheet P is discharged.

Second Embodiment

Figure 8:
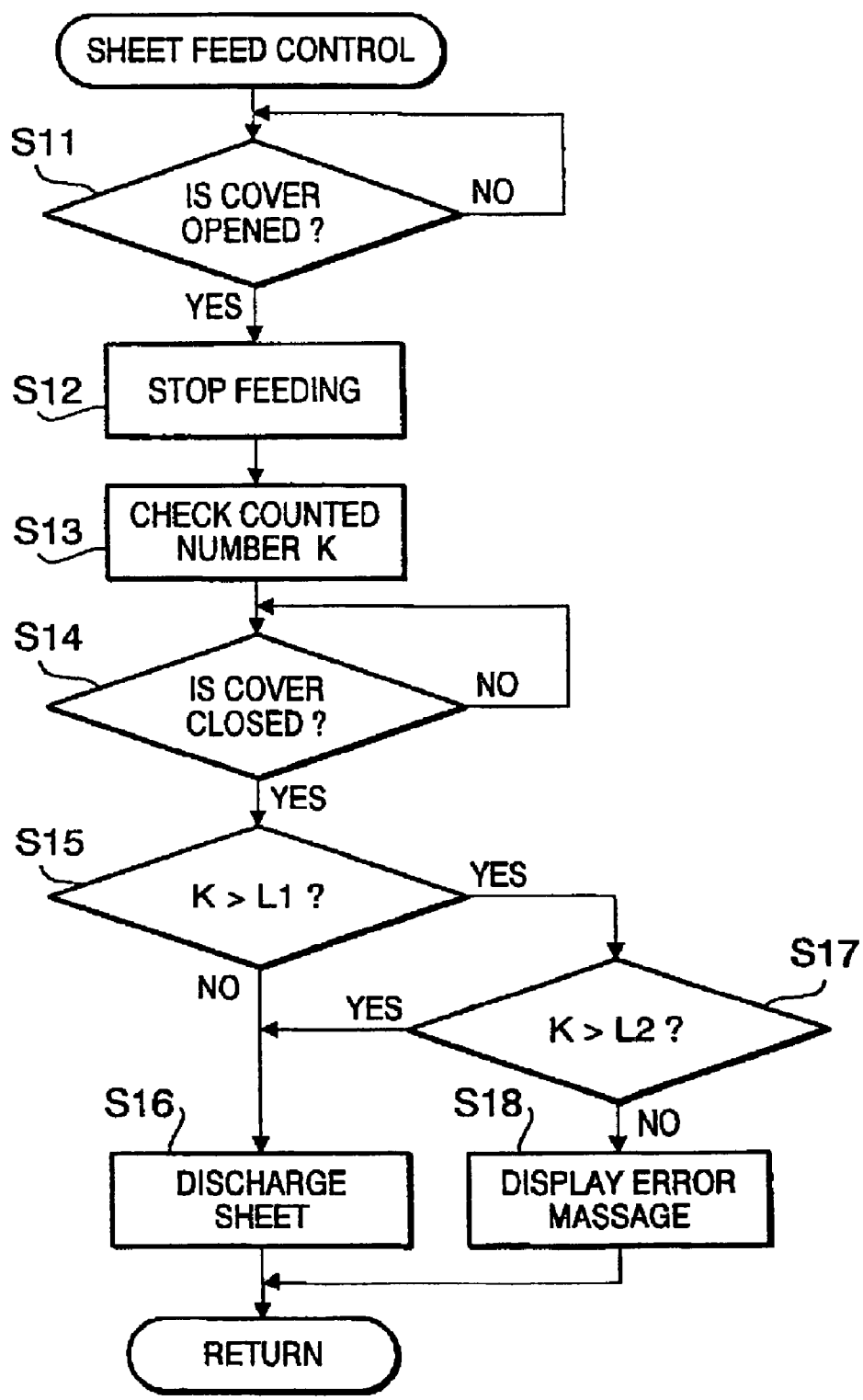
FIG. 8 is a flowchart illustrating a sheet feed control of the facsimile apparatus according to a second embodiment.

FIG. 8 is a flowchart illustrating the sheet feed operation according to a second embodiment. According to the second embodiment, when the cover 12 is opened, the location of the sheet P is detected precisely, and then, based on the detected location of the sheet P, the CPU 30 judges whether the sheet P should be discharged.

If the CPU 30 judges that the cover 12 is opened (S11: YES), the CPU 30 stops feeding the sheet P (S12). In S13, the CPU 30 checks counted number K to detect the location of the leading end of the sheet P (S13).

It should be noted that, according to the second embodiment, the facsimile apparatus is provided with an encoder (or pulse generator) 40 (see FIG. 6), which outputs a pulse signal representative of the rotation amount of the sheet feed roller 22. The output of the encoder is transmitted to the CPU 30. By counting the number of the pulses after the second sensor 23 detects the leading end of the sheet P, a distance by which the sheet P has proceeded from the second sensor 23 along the sheet feed path A can be detected accurately. Specifically, according to the second embodiment, when the status of the second sensor 23 is changed from OFF to ON, the CPU 30 starts counting the number of pulses output by the encoder 40.

In subsequent operations, the CPU 30 restarts counting the number of pulses output by the encoder 40, when the status of the first sensor 23 is changed from OFF to ON. In the following description, the number of pulses counted by the CPU 30 is represented by K. Since the positional relationships of the facing unit 26 and the discharge rollers 28 with respect to the second sensor 23 are fixed, the number of pulses output when the leading end proceeds from the second sensor 23 to the facing unit 26, and the number of pulses output when the leading end proceeds from the second sensor 23 to the discharge rollers 28 are known, which are represented by L1 and L2, respectively. It should be noted that, strictly speaking, L1 represents a predetermined position, e.g., a position corresponding to an upstream side end of an length of the facing unit 26 along the sheet feed path A. In the following description, the position represented by L1 will be simply referred to as a position of the facing unit 26, for the sake of simplicity.

With the above configuration, based on the relationships of the counted value K with respect to the predetermined numbers L1 and L2, the location of the leading end of the sheet P, in relation to the second sensor 23 and the discharge rollers 28, is identified. That is, when K is smaller than L1, the leading end of the sheet P is located on the downstream side of the facing unit 26; when K is equal to L1, the leading end of the sheet P is located at an intermediate position, e.g., at the facing unit 26; when K is greater than L1 and smaller than L2, the leading end of the sheet P is located on the downstream side of the discharge rollers 28 (i.e., between the facing unit 26 and the discharge rollers 28).

In S13, the CPU 30 checks the counted number K, which is the counted value of the pulses output by the encoder 40 since the second sensor was turned from OFF to ON.

Then, when the cover 12 is closed (S14: YES), the CPU 30 judges whether the leading end of the sheet P is located on the upstream side of the facing unit 26 (S15). If K≦L1, that is, if the leading end of the sheet P is located on the upstream side of the facing unit 26 (S15: NO), the CPU 30 controls the discharge roller 28 to discharge the sheet P (S16).

It should be noted that, when the leading end of the sheet P is located at a position on the upstream side of facing unit 26, it is likely that the sheet jam would not occur. Therefore, in this case, the sheet P is discharged.

If K≦L1, that is, if the leading end of the sheet P is not located on the upstream side of the facing unit 26 (S15: YES), then the CPU 30 judges whether the leading end of the sheet P is located on the upstream side of the discharge rollers 28 (S17). If K≦L2, that is, if the leading end of the sheet P is not located on the upstream side of the discharge rollers 28 (S17: NO), the CPU 30 controls the discharge roller 38 to discharge the sheet P (S16). If K≦L2, that is, if the leading end of the sheet P is located on the upstream side of the discharge rollers 28 (S17: YES), an error message is displayed on the display unit 17 (S18).

If the leading end of the sheet P is located on the downstream side of the facing unit 26 (i.e., K>L1), and on the upstream side of the discharge rollers 28 (i.e., K≦L2), the leading end of the sheet P may likely be located at the facing unit 26, and in such a case, the error message is displayed.

If K>L2, i.e., if the leading end of the sheet P is not located on the upstream side of the discharge rollers 28, it is likely that the leading end of the sheet P is located on the downstream side of the discharge roller 28. In this case, the sheet P is discharged (S16).

As described above, by employing an encoder or the like, the location, within the sheet feed path A, of the leading end of the sheet P can be detected accurately. Therefore, the position of the sheet P, when the cover 12 is opened, can be detected accurately, which improves accuracy of the sheet feed control.

It should be noted that, in the second embodiment, the leading end of the sheet P is detected using the encoder or the like, the configuration described above is only an example, and various modification can be made. For example, the position represented by L1 and L2 can be modified depending on the structure of the sheet feed path and/or sheet feed mechanism. In a particular case, L1 can be set to zero. In such a case, whether the sheet is discharged or not is determined based on whether the leading end of the sheet is located between the second sensor and the discharge roller or not.

For another example, instead of using the encoder, by providing a plurality of sheet sensors along the sheet feed path A, the location of the sheet P being fed can be detected accurately.

Third Embodiment

Figure 9:
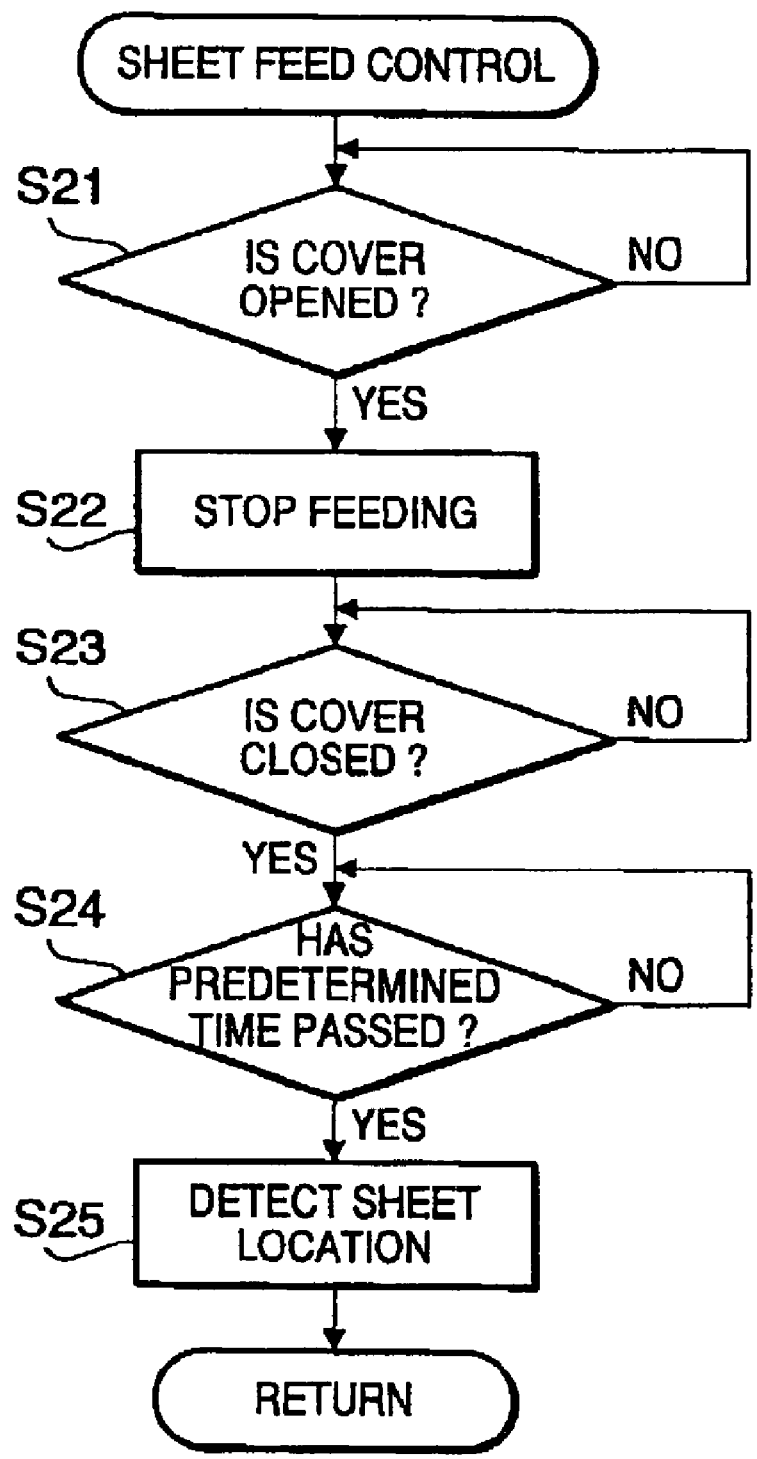
FIG. 9 a flowchart illustrating a sheet feed control of the facsimile apparatus according to a third embodiment.

FIG. 9 shows a flowchart illustrating the sheet feed procedure according to the third embodiment. According to the third embodiment, a detection error, which occurs due to vibration of the sensor when the cover 12 is opened and/or closed, is dealt with. Specifically, the procedure shown in FIG. 9 is to replace steps S11 through S13 of FIG. 8.

When the cover 12 is opened (S21: YES), the CPU 30 stops feeding of the sheet P along the sheet feed path A (S22). Then, when the CPU 30 judges that the cover 12 is closed (S23: YES), the CPU 30 judges whether a predetermined time (e.g., 0.5 seconds) has passed (S24). If the predetermined time has passed (S24: YES), the CPU 30 starts detecting whether a sheet is present or not (S25) based on the output of the first sensor 21. Thereafter, a procedure as described above, for example, a procedure as in steps S14-S18 of the second embodiment is performed to discharge the sheet P or display the error message.

According to the third embodiment, the presence/absence of a sheet is detected predetermined period after the cover has been opened and then closed. With this configuration, before the predetermined time period has passed, erroneous detection of the presence of a sheet due to vibration of the sensor 21 can be ignored.

In an alternative embodiment, the procedure in S24 can be replaced with a procedure, in which whether a predetermined time period (e.g., 0.3 seconds) has passed since the sensor 21 was ON.

In an alternative embodiment, step S24 can be inserted between steps S3 and S4 of FIG. 7. With this configuration, the judgment in S4 will not be affected by the vibration which may occur when the cover 12 is closed.

It can readily be derived from the above that, step S24 may be employed when the cover 12 is opened or closed, and the output of the sensor 21 or 23 is to be checked. By providing a time period, during which the sensor 21 or 23 may malfunction, erroneous detection of the presence/absence of the sheet can be avoided.

It should be noted that the invention is not limited to the above-described exemplary embodiments, and various modification can be made. For example, the invention is described with reference to a facsimile apparatus which includes a printer, a scanner, a communication device an the like. However, the invention may also be applied to individual devices (e.g., the printer, scanner and the communication devices) provided with a sheet feeding device.

In the above-described embodiments, the sheet feed is controlled in response to the opening/closing of the cover 12. The procedure may be modified such that the sheet feed is controlled in response to an operation of predetermined keys (e.g., a stop key and a start key).

The present disclosure relates to the subject matter contained in Japanese Patent Application No. 2001-263946, filed on Aug. 31, 2001, which is expressly incorporated herein by reference in its entirety.

What is claimed is:

1. An image reading device having a main body and a cover, said cover being opened/covered a top surface of said main body, a sheet feed path being defined inside said cover, an intermediate portion of said sheet feed path facing said top surface of said main body being exposed to said top surface thereby said top surface defines said sheet feed path at said intermediate portion, said cover having a sheet feed mechanism which feeds a sheet along said sheet feed path, feeding of the sheet being terminated in response to, at least one of moving said cover to an open position or inputting a command indicating termination of a sheet feed, said image reading device further comprising:
 a sheet location detection system that detects a sheet location where the feeding of the sheet is terminated; and
 a controller that determines whether the sheet is to be discharged from said sheet feed path in response to, at least one of moving said cover to a closed position or inputting a command indicating restart of the sheet feed, in accordance with the sheet location detected by said sheet location detection system.

2. The image reading device according to claim 1, wherein said sheet location detection system includes:
 a first sensor that is located at an upstream side end of said sheet feed path to detect whether a sheet is absent or present; and
 a second sensor that is located at an upstream side of and close to said intermediate portion to detect whether a sheet is absent or present,
 wherein said controller determines the sheet is to be discharged only when one of said first sensor and said second sensor detects a presence of a sheet.

3. The image reading device according to claim 1, wherein the feeding of the sheet is terminated in response to moving said cover to the open position, and wherein the feeding of the sheet is restarted in response to moving said cover to the closed position.

4. The image reading device according to claim 3, wherein an image sensor is provided on said main body at a position facing said intermediate portion of said sheet feed path.

5. The image reading device according to claim 1, wherein said sheet location detection system detects a leading end of a sheet fed through said sheet feed path.

6. The image reading device according to claim 5, wherein said controller determines that the sheet is to be discharged if the leading end of the sheet, when the feeding of the sheet is terminated, is detected to be located on an upstream side of said intermediate portion.

7. The image reading device according to claim 5, further comprising a sheet discharging system located on a downstream side of said intermediate portion, said sheet discharging system feeding a sheet to discharge from the sheet feed path, wherein said controller determines that the sheet is to be discharged if the leading end of the sheet, when the feeding of the sheet is terminated, is detected to be located on a downstream side of said sheet discharging system.

8. The image reading device according to claim 5, wherein said controller determines that the sheet is not to be discharged if the leading end of the sheet, when the feeding of the sheet is terminated, is detected to be located in said intermediate portion.

9. The image reading device according to claim 5, further comprising a sheet discharging system located on a downstream side of said intermediate portion, said sheet discharging system feeding a sheet to discharge from the sheet feed path, wherein said controller determines that the sheet is not to be discharged if the leading end of the sheet, when the feeding of the sheet is terminated, is detected to be located in said intermediate portion or a downstream side thereof and on an upstream side of said sheet discharging system.

10. The image reading device according to claim 1, further comprising a display unit, said controller controls said display unit to display an error message when said controller determines that the sheet is not to be discharged.

11. The image reading device according to claim 1, wherein said sheet location detection system includes:
 a sensor located at an upstream side end of said sheet feed path to detect a presence of a sheet; and
 a feeding amount detection system that detects a feeding amount of a sheet fed by said sheet feed mechanism,
 the location of the sheet being detected based on the feeding amount after said sensor detects the presence of the sheet.

12. An image reading device having a main body and a cover, said cover being opened/covered a top surface of said main body, a sheet feed path being defined inside said cover, an intermediate portion of said sheet feed path facing said top surface of said main body being exposed to said top surface thereby said top surface defines said sheet feed path at said intermediate portion, said cover having a sheet feed mechanism which feeds a sheet along said sheet feed path, feeding of the sheet being terminated in response to, at least one of moving said cover to an open position or inputting a command indicating termination of a sheet feed, said image reading device comprising:
 a cover open sensor that detects whether said cover is closed;
 a sheet location detection system that detects a sheet location in response to moving the cover to a closed position; and
 a controller that determines whether the sheet is to be discharged from said sheet feed path in accordance with the sheet location detected by said sheet location detection system.

13. The image reading device according to claim 12, wherein said sheet location detection system detects the sheet location a predetermined time period after said cover open sensor detects that said cover is closed.

14. The image reading device according to claim 13, said sheet location detection system includes at least a sensor arranged in said sheet feed path to detect a presence of the sheet, said sensor having a movable member to be moved by the sheet being fed through said sheet feed path, said sensor detects the presence of the sheet in response to movement of said movable member.

15. The image reading device according to claim 14, said at least a sensor including a first sensor located at an upstream side end of said sheet feed path.

16. A method of feeding a sheet in an image reading device having a main body and a cover, the cover opening/covering a top surface of the main body, a sheet feed path being defined inside the cover, an intermediate portion of the sheet feed path facing the top surface of the main body being exposed to the top surface thereby the top surface defines the sheet feed path at the intermediate portion, the cover having a sheet feed mechanism which feeds a sheet along the sheet feed path, feeding of the sheet being terminated in response to, at least one of moving the cover to an open position or inputting a command indicating termination of a sheet feed, the method comprising:

detecting a sheet location where the feeding of the sheet is terminated; and determining whether the sheet is to be discharged from said sheet feed path in response to, at least one of moving said cover to a closed position or inputting a command indicating restart of the sheet feed, in accordance with the sheet location.

17. The method according to claim 16, further comprising:

discharging the sheet when the sheet is determined to be discharged; and displaying a predetermined message when the sheet is determined not to be discharged.

* * * * *